(12) United States Patent
Wang et al.

(10) Patent No.: US 9,589,061 B2
(45) Date of Patent: Mar. 7, 2017

(54) COLLECTING LEARNING MATERIALS FOR INFORMAL LEARNING

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 14/245,764

(22) Filed: Apr. 4, 2014

(65) Prior Publication Data

US 2015/0286736 A1   Oct. 8, 2015

(51) Int. Cl.
G06F 17/30 (2006.01)
H04L 29/08 (2006.01)

(52) U.S. Cl.
CPC ........ *G06F 17/30873* (2013.01); *H04L 67/02* (2013.01); *H04L 67/20* (2013.01)

(58) Field of Classification Search
CPC ................................................ G06F 17/30864
See application file for complete search history.

(56) References Cited

U.S. PATENT DOCUMENTS

| | | | | |
|---|---|---|---|---|
| 7,080,073 B1* | 7/2006 | Jiang | ................... | G06F 17/2229 707/999.007 |
| 7,379,932 B2* | 5/2008 | Agrawal | ........... | G06F 17/30864 707/710 |
| 8,060,816 B1* | 11/2011 | Aggarwal | ......... | G06F 17/30864 715/205 |
| 2002/0099700 A1* | 7/2002 | Li | ..................... | G06F 17/30864 707/999.005 |
| 2005/0071478 A1* | 3/2005 | Bates | .................. | G06F 17/3089 709/228 |
| 2008/0228675 A1* | 9/2008 | Duffy | .................... | G06F 17/278 706/10 |

OTHER PUBLICATIONS

Shelton, Brett E., et al. "Linking open course wares and open education resources: creating an effective search and recommendation system." Procedia Computer Science 1.2 (Jan. 2010): 2865-2870.

Xiong, Yuhong, et al. "OfCourse: web content discovery, classification and information extraction for online course materials." Proceedings of the 18th ACM conference on Information and knowledge management. ACM, Nov. 2009.

(Continued)

*Primary Examiner* — Khanh Pham
(74) *Attorney, Agent, or Firm* — Maschoff Brennan

(57) ABSTRACT

A method of collecting learning materials for informal learning may include detecting an addition of an item to a curation. The method may include extracting one or more links in a page referenced by the item. The method may include downloading pages corresponding to the one or more links. The method may include filtering the downloaded pages to generate candidate index pages. The method may also include identifying an appropriate index page from the candidate index pages. The method may further include locating a primary information block in the appropriate index page. The method may also include generating an automated extraction rule configured to direct a system to the primary information block of the appropriate index page.

18 Claims, 11 Drawing Sheets

(56) References Cited

OTHER PUBLICATIONS

Naghibi, Mahdi, and Adel Torkaman Rahmani. "Focused crawling using vision-based page segmentation." Information Systems, Technology and Management. Springer Berlin Heidelberg, Mar. 2012. 1-12.

Peng, Tao, Changli Zhang, and Wanli Zuo. "Tunneling enhanced by web page content block partition for focused crawling." Concurrency and Computation: Practice and Experience 20.1 (Jan. 2008): 61-74.

* cited by examiner

COLLECTING LEARNING MATERIALS FOR INFORMAL LEARNING

FIELD

The embodiments discussed herein are related to collecting learning materials for informal learning.

BACKGROUND

In informal learning, learners may largely dictate and vary a subject matter of study. Accordingly, in an informal learning system, the subject matter may be well-tailored to interests of the learner. For example, learners may create curations. Curations may include a list of items, such as digital files and/or online media, which are organized by the curator, e.g., the learner. The items in the curations may be organized according to topic or theme. Collecting good and/or relevant items and learning materials which may be added to the curations pose some difficulty, especially the new learning material not covered by common open educational resources (OER). For example, batch collected learning materials are not finely tailored and not flexible for each learner's interests. Likewise, manual input of learning materials by the learners is limited and not scalable. Some informal learning systems use crawling tools. However, the crawling tools may be designed to collect learning materials based on general topics.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of collecting learning materials for informal learning may include detecting an addition of an item to a curation. The method may include extracting one or more links in a page referenced by the item. The method may include downloading pages corresponding to the one or more links. The method may include filtering the downloaded pages to generate candidate index pages. The method may also include identifying an appropriate index page from the candidate index pages. The method may further include locating a primary information block in the appropriate index page. The method may also include generating an automated extraction rule configured to direct a system to the primary information block of the appropriate index page.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments discussed herein are related to collecting learning materials for informal learning and/or to generation of an automated extraction rule (rule) based on an item added to an informal learning system. The rule may direct a system to a source, which is referred to herein as an appropriate index page. The rule may allow a learning server or a learning system to subsequently fetch learning materials from the appropriate index page. In some embodiments, the fetching of learning materials may be periodically performed according to an extraction frequency, which may be determined based upon analysis of learning activities of multiple learners and their use of the rule and associated extraction rules (associated rules).

An example embodiment includes a method of collecting learning materials for informal learning. The method may include detecting an addition of an item to a curation, for example, a learner bookmarking a web page (page) or adding a page as an item to the curation. The links contained in a page referenced by the item may be extracted and the pages corresponding to the links may be downloaded. The downloaded pages may be filtered based upon whether the downloaded pages include a link pointing back to the page referenced by the item. The filtered pages may be candidate index pages. The method may also include identifying an appropriate index page from the candidate index pages. The method may further include locating a primary information block in the appropriate index page. The method may also include generating a rule configured to direct a system to the primary information block of the appropriate index page. This and other embodiments will be explained with reference to the accompanying drawings.

Figure 1:
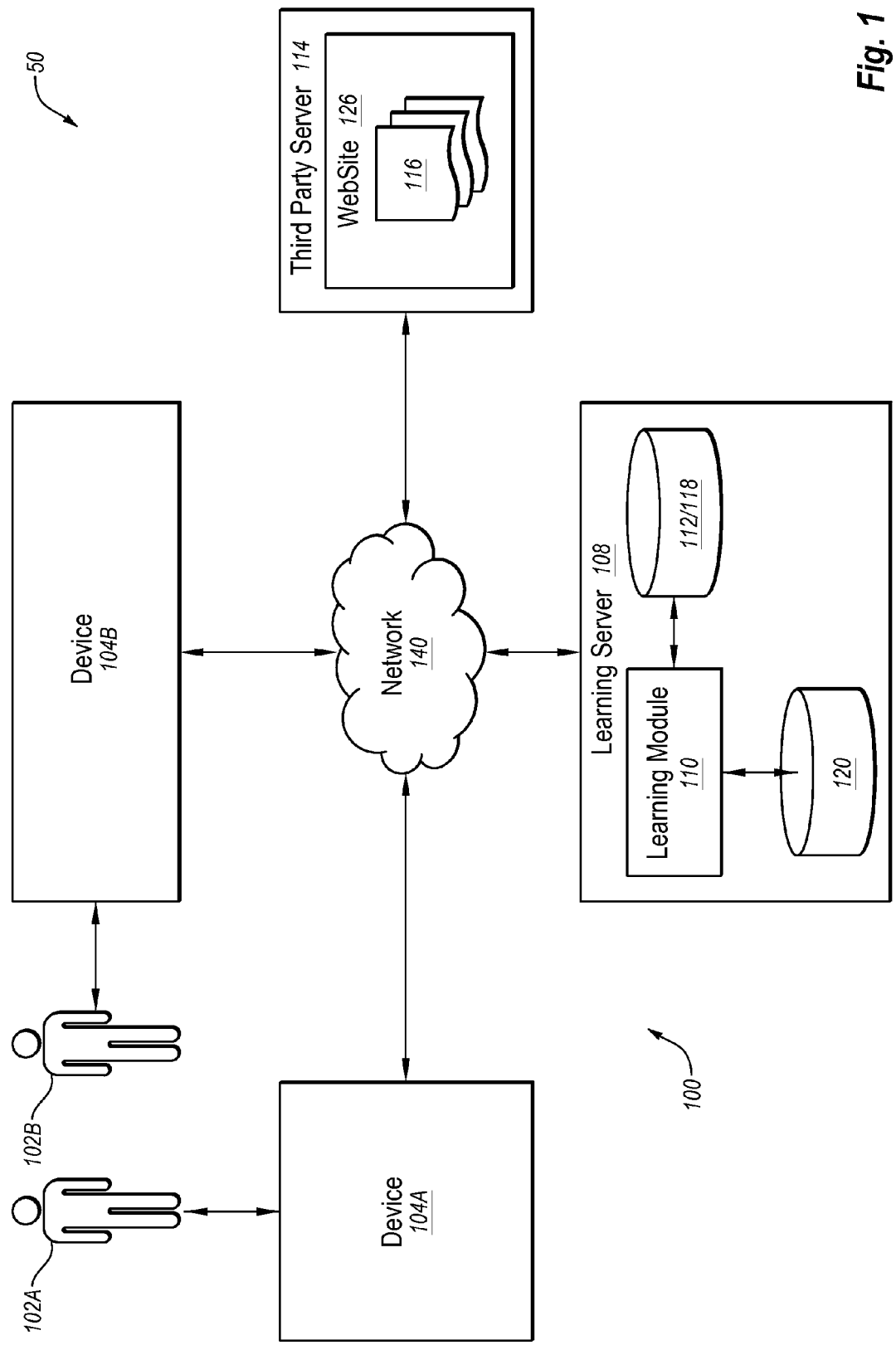
FIG. 1 illustrates a block diagram of an example operating environment including an example informal learning system (learning system)

FIG. 1 illustrates a block diagram of an example operating environment 50 including an example informal learning system (learning system) 100. The learning system 100 may be configured such that sources of learning materials may be identified in the operating environment 50. The learning materials may then be collected from the sources and made available for informal learning. The sources or potential sources of learning materials are referred to herein as index pages.

In the depicted embodiment, the operating environment 50 may include two learners 102A and 102B (generally, learner 102 or learners 102). The learners 102 may include any individual or entity such as a student that is interfacing with the learning system 100. The learners 102 may be associated with devices 104A and 104B (generally, device 104 or devices 104). The devices 104, a third party server 114, and a learning server 108 may communicate via a network 140. For example, the devices 104, the third party server 114, and the learning server 108 may communicate learning materials via the network 140.

Additionally, in the learning system 100 of FIG. 1, the learning server 108 may include a learning module 110. The learning module 110 may be configured to collect learning materials for informal learning. Specifically, in some embodiments, the learning module 110 may enable communication of the learning materials and/or information pertaining to the learning materials between the devices 104, the learning server 108, and the third party server 114 via the network 140.

The network 140 may be wired or wireless and may have numerous different configurations including, but not limited to, a star configuration, a token ring configuration, or other configurations. Furthermore, the network 140 may include a local area network (LAN), a wide area network (WAN) (e.g., the Internet), and/or other interconnected data paths across which multiple devices may communicate. In some embodiments, the network 140 may be a peer-to-peer network. The network 140 may also be coupled to or include portions of a telecommunications network that may enable communication of data in a variety of different communication protocols.

In some embodiments, the network 140 may include BLUETOOTH® communications networks and/or cellular communications networks for sending and receiving data including via short messaging service (SMS), multimedia messaging service (MMS), hypertext transfer protocol (HTTP), direct data connection, wireless application protocol (WAP), e-mail, etc.

The third party server 114 may include a hardware server that includes a processor, memory, and communication capabilities. In the illustrated embodiment, the third party server 114 may be coupled to the network 140 to send and receive information and data to and from the devices 104 and/or the learning server 108 via the network 140.

The third party server 114 may be configured to host a website 126 that is accessible via the network 140. Specifically, in some embodiments, the third party server 114 may allow access to the website 126 by the learners 102 using the devices 104, and/or the learning server 108 using the learning module 110. The learners 102, the devices 104, and the learning server 108 may accordingly access and/or interface with the website 126 via the network 140.

In particular, the website 126 may include one or more pages 116. Each of the pages 116 may be accessed by a first learner 102A using a first device 104A. The first device 104A, the second device 104B, the learning module 110 of the learning server 108, or any combination thereof may also access the website 126 including each of the pages 116 accessed by the first learner 102A as well as other pages 116 included in the website 126.

As used herein, accessing a given one of the pages 116 may include, but is not limited to, copying the page 116 to a system repository 112 or a personal repository 118 (shown together in FIG. 1 as 112/118), adding the page 116 to a curation, bookmarking the page 116 in the learning system 100, performing analysis of the structure of the uniform resource locator (URL) of the page 116, performing a page structure analysis of the page 116, performing a content coherence analysis of the page 116, or some combination thereof.

The devices 104 may include computing devices that include a processor, memory, and network communication capabilities. For example, each of the devices 104 may include a laptop computer, a desktop computer, a tablet computer, a mobile telephone, a personal digital assistant ("PDA"), a mobile e-mail device, a portable game player, a portable music player, a television with one or more processors embedded therein or coupled thereto or other electronic device capable of accessing the network 140.

The devices 104 may be configured to enable interaction with the learners 102. For example, the devices 104 may be configured to provide a user interface in a browser by the learning module 110 that allows the learners 102 to create and modify curations. In this and other embodiments, the devices 104 may provide the user interface. In some embodiments, the devices may include a program (e.g., a thin-client program) installed thereon that provides the user interface and/or one or more functions attributed to the devices 104.

The curations may include sets of learning materials, which may be related to a particular subject, that the learner 102 has combined and/or organized. For example, a curation may include items referring to multiple pages (e.g., the pages 116) from various sources related to a specific topic. In some embodiments, the devices 104 may enable the learners 102 to add an item to a curation via the learning module 110. The item may include learning material, a text document, an image, a video, an article, a series of articles, a portion of an article, graphics, or any other digital information in any form.

For example, the devices 104 may enable the learners 102 to access the pages 116 of the website 126 via the network 140. The learners 102 may then add the page 116 and/or add a bookmark to the page 116 to the curation. A signal may be communicated to the learning module 110 of the learning server 108 indicating the addition of the item. Additionally or alternatively, the learning module 110 may detect the addition of the item.

The learning module 110 may also be configured to track a date/time of when the item is added to the curation. For example, each time the first learner 102A adds the page 116 from the website 126, the learning module 110 may record or otherwise track the date/time of the addition. Additionally or alternatively, the devices 104 may record or otherwise track the date/time of the addition. The devices 104 may communicate data/time information to the learning module 110 of the learning server 108. Additionally or alternatively, the devices 104 may be configured to enable the learning module 110 of the learning server 108 to track the date/time of item additions.

The personal repository 118 may store curations created by the learners 102, the items included in the curations, and/or learning materials. In some embodiments, the personal repository 118 may exist at least in part in the system repository 112. For example, the system repository 112 may include a portion designated for one or more of the learners 102, which may be a personal repository. Additionally or alternatively, the personal repository 118 or some portion thereof may be located on the devices 104.

The learning server 108 may include a hardware server that includes a processor, a memory, and network communication capabilities. In the illustrated embodiment, the learning server 108 may be coupled to the network 140 to send and receive data to and from the devices 104 and/or the third party server 114 via the network 140. The learning server 108 may include the learning module 110. The learning module 110 may be configured to interact with the devices 104 and/or the third party server 114 to collect learning materials for informal learning in the learning system 100.

In some embodiments, one or both of the learners 102 may add an item to the curation. For example, the first learner 102A may use the first device 104A to add one of the pages 116 to the curation. Additionally or alternatively, the first learner 102A may use the first device 104A to bookmark one of the pages 116 in the curation. The learning module 110 may detect the addition of the item to the curation. In some embodiments, the learning module 110 of the learning server 108 may detect the addition of the item via the network 140. Additionally or alternatively, the devices 104 may detect the addition of the item and may communicate a signal indicating the addition of the item to the learning module 110.

The learning module 110 may then extract one or more links contained in the page referenced by the item. In some embodiments, the learning module may extract all of the links in the page. The links may correspond to or include paths to pages such as the pages 116. Some of the links may correspond to pages that point back to the page referenced by the item. Some of the links may correspond to pages that do not point back to the page referenced by the item.

For example, the website 126 of the third party server 114 may include the pages 116 that are at least partially organized in a tree structure. The page 116 that may be added in a curation may refer to a leaf node in the tree structure. The links contained in the page may correspond to the pages 116 that are sibling nodes in the tree structure, parent nodes in the tree structure, or children nodes in the tree structure. The pages 116 that are nodes in the tree structure may generally reference the page 116 that may be the item. Additionally, the links may include paths to other websites and/or other pages included in the websites. The other pages from the other websites may not point back to the page referenced by the item.

The learning module 110 may download the pages corresponding to the links For example, the learning module 110 may access the pages 116 corresponding to the links via the network 140. The learning module 110 may then download the pages 116 from the website 126. The learning module 110 may then filter the downloaded pages to generate candidate index pages. In particular in some embodiments, the learning module 110 may exclude the downloaded pages not having links pointing back to the page reference by the item.

The learning module 110 may identify an appropriate index page from the candidate index pages. Additionally, the learning module 110 may locate a primary information block in the appropriate index page and/or the candidate index pages (collectively, index pages). The appropriate index page may include a page that may be later accessed by the learning module 110 to find other learning materials that may be appropriately collected. The primary information block may include a portion of the index pages where a majority of the substantive information is contained. In general the primary information block includes a center portion of a page and/or may include a list of links to one or more other pages. In contrast a side information block may include a portion of the index pages where secondary portions of substantive information is contained. In general the side information blocks include a side portion of a page and/or may include a list of links to one or more other pages. When the learning module 110 later visits the appropriate index page, the learning module 110 may fetch learning materials from the primary information block. In some embodiments, locating the primary information block in the index pages may be included in identifying the appropriate index page.

To locate the primary information block and/or at least partially identify the appropriate index page, the learning module 110 may perform a page structure analysis of one or more of the candidate index pages. The page structure analysis of the candidate index pages may include an analysis of the position and layout of the content of the candidate index pages. Specifically, in this and other embodiments, the page structure analysis may include the learning module 110 detecting a position of the link pointing back to the page reference by the item.

For example, the primary information block may generally be in a center portion of the page 116. Accordingly, the learning module 110 may locate the primary information block of the candidate index pages as the center portion of the candidate index pages. The learning module 110 may then determine whether the links pointing back to the page referenced by the item are positioned in the primary information block. In some embodiments, the candidate index pages having the link pointing back to the page referenced by the item in the primary information block may be better candidates for the appropriate index page.

Additionally or alternatively, the learning module 110 may perform a URL structure analysis to identify or at least partially identify the appropriate index page. In some embodiments, the learning module 110 may compare URL structures of one or more of the candidate index pages to determine the depth of the candidate index pages. Generally, referring to the website 126 having the tree structure, the URL structure may be an indication of the depth of the page 116 included in the tree structure. For example, a longer URL may indicate a deeper or lower leaf node in the tree structure, while a shorter URL may indicate a shallower or higher leaf node (or root node) in the tree structure. Accordingly, a longer URL may be an indication of a more specific subject matter, which may be a characteristic of a better appropriate index page.

Additionally or alternatively, the learning module 110 may perform a content coherence analysis to identify or at least partially identify the appropriate candidate page. The content coherence analysis may include a text similarity analysis to check the similarity of the content in the primary information block. A primary information block that includes more similar content or more closely-related content may be indicative of a better appropriate index page.

In this and other embodiments, the learning module 110 may perform one or more processes to identify the appropriate index page. In some embodiments, when there are two candidate index pages a first candidate index page with a link pointing back to the page referenced by the item in a primary information block and a second candidate index page with a link pointing back to the page reference by the item in a side information block, the learning module 110 may identify the first candidate index page as the appropriate index page. In some embodiments, learning module 110 may perform the page structure analysis, the URL structure analysis, and the content coherence analysis. For example, the learning module 110 may detect the information blocks containing links pointing back to the page reference by the item in the candidate index pages. The learning module 110 may then locate a primary information block in one or more of the candidate index pages based on a page structure analysis. For the candidate index pages that include the links pointing back to the page reference by the item in the primary information block, the learning module 110 may compare the URL structures. The learning module 110 may then determine whether URL structures of two or more of the candidate index pages have a same depth that is greater (e.g., deeper) than the URL structures of the other candidate index pages. In response to URL structures of two or more of the candidate index pages not having the same depth that is greater than the URL structures of the other candidate index pages, the learning module 110 may identify the appropriate index page based on URL depth. For example, the candidate index page having the deepest URL may be identified as the appropriate index page.

In response to the URL structures of two or more of the candidate index pages having the same depth that is greater than the URL structures of the other candidate index pages, the learning module 110 may measure the content coherence of the primary information blocks of the candidate index pages having URL structures of the same depth. The learning module 110 may then identify the appropriate index page as the candidate index page having the highest content coherence.

Additionally in some embodiments, the learning module 110 may measure a page structure score, a URL score, and a coherence score for the one or more of the candidate index pages.

The page structure scores may be based on the page structure analysis. For example, candidate index pages having a link point back to the page referenced in the item in a primary information block may receive a page structure score of one. Candidate index pages having a link pointing back to the page referenced in the item in a side information block may receive a page structure score of 0.33 or 0.5, for instance. The candidate index pages without a link pointing back to the page referenced in the item may receive a page structure score of zero or may be filtered prior to the page structure analysis.

The URL scores may be based on a URL structure analysis. In some embodiments, the candidate index pages having the deepest URL structure may receive a URL score of one and the other candidate index pages may receive a URL score equal to the ratio of URL parts of each of the URL structures of the other candidate index pages in relationship to the number of parts in the deepest URL structure. For example, a candidate index page may include a deepest URL. The deepest URL may include four parts: a domain name, a directory, a subdirectory, and a file name. The candidate index page having the deepest URL may receive a URL score of one. One or more other candidate index pages may include a second-deepest URL. The second-deepest URL may include three parts: a domain name, a directory, and a subdirectory. The one or more candidate index pages having the second-deepest URL may receive a URL score of 0.75 (e.g., 3 URL parts/4 URL parts). One or more other candidate index pages may include a third-deepest URL. The third-deepest URL may include two parts: a domain name and a directory. The one or more candidate index pages having the third-deepest URL may receive a URL score of 0.5 (e.g., 2 URL parts/4 URL parts).

The coherence score may be based on a coherence analysis of the candidate index pages. In some embodiments, the coherence analysis may include an average text similarity score which may be based on a vector space model (VSM) of a primary information block and/or a side information block in which the link pointing back to the page referenced by the item is located. In some embodiments, the text similarities may be determined among text associated with the links included in the primary information block and/or the side information block. In these and other embodiments, the coherence scores of the candidate index pages may be include values between zero and one.

The learning module 110 may assign weights to each of the page structure score, the URL score, and the coherence score. In some embodiments, the weights may add to a value of one. For instance, a first weight assigned to the page structure score may be 0.35, a second weight assigned to the URL score may be 0.15, and a third weight assigned to the coherence score may be 0.5. Additionally or alternatively, the weights may be determined and/or optimized via a suitable machine learning technique.

The learning module 110 may calculate a total score for one or more of the candidate index pages. The total score may be calculated based on a linear combination of products each of the page structure score, the URL score, and the coherence score and the assigned weights for one or more of the candidate index pages. For example, a first page structure score may be generated for a first candidate index page to be 0.5, a first URL score may be generated for the first candidate index page to be 0.8, and a first coherence score may be generated for the first candidate index page to be 0.866. The assigned weights may be 0.35 for the page structure score, 0.25 for the URL score, and 0.4 for the coherence score. Accordingly, the total score for the first candidate index page may be 0.7214 (0.5*0.35+0.8*0.25+0.866*0.4). The learning module 110 may identify the appropriate index page based on the total scores.

The learning module 110 may generate a rule. The rule may be configured to direct the learning system 100 or some component thereof such as the learning server 108 or one or more of the devices 104 to the primary information block of the appropriate index page. The learning system 100 or some component thereof may fetch learning materials from the primary information block of the appropriate index page. For example, after the rule is generated, the first device 104A may fetch a learning material from the primary information block of the appropriate index page using the rule. In some embodiments, the rule may include a URL of the appropriate index page and an induced XPath of one or more URLs contained in the primary information block.

The learning module 110 may then deposit the learning material in the personal repository 118 and/or the system repository 112. For example, the first learner 102A may add the learning material as a new item to a curation. The learning module 110 may then generate another rule based on the new item according to a process described above. The learning module 110 may then use the rule to later visit the primary information block of the appropriate index page via the network 140, fetch learning material therefrom, and deposit the learning material in a first personal repository 118A.

In this and other embodiments, the learning module 110 may determine an extraction frequency at which learning materials may be automatically fetched from the primary information block of the appropriate index page. The extraction frequency may be based on learning activities of one or more of the learners 102. For example, the learning module 110 may analyze the rule along with learning activities of the learners 102 that interface with the learning system 100. Based on the analyzed learning activity, the learning module 110 may determine the extraction frequency. The learning module 110 may then fetch learning material from the appropriate index page at the extraction frequency and deposit the learning materials from the appropriate index page in one or more of the repository 118 and/or the system repository 112.

For example, the website 126 may include a digital magazine in which an author publishes a monthly article on a particular subject. One or more of the learners 102 may be visiting the website 126 each month and adding the article to their curations. The learning module 110 may generate a rule based on the articles. The rule may indicate the appropriate index page, which may include a primary information block of the digital magazine, for example. Furthermore, the learning module may analyze the learning activity (e.g., the monthly addition of the articles) to determine the extraction frequency of one month. The learning module 110 may then fetch the article from the website 126 each month and deposit the article in one or more of the personal repository 118 and/or the system repository 112.

The analysis of the learning activity and/or the rule may occur at least partially each time the rule is generated. For example, the learning module 110 may receive the rule. The learning module 110 may then log the rule. For example, the rule may be logged with the item from which it was generated and/or with associated rules from multiple learners 102. The associated rules may be a same rule or a related or sufficiently similar rule. For example, associated rules may include rules having the same URL and the same XPath, having URLs with the same domain name, subdirectory, or file name, and/or similar XPaths.

The learning module 110 may determine whether the rule exists in a log 120. The log 120 in FIG. 1 is depicted in the learning server 108. In other embodiments, the log 120 may be located at one or more of the devices 104 or another location accessible via the network 140. In response to the rule not existing in the log 120, the learning module 110 may stop the analysis learning activity and/or rule. In these and other embodiments, the learning module 110 may stop the analysis because the rule has only been generated once, which may be insufficient to justify the determination of the extraction frequency and subsequent fetching of learning materials based thereon.

In response to the rule existing in the log 120, the learning modules may determine whether application of the rule and the associated rules is greater than a particular threshold. In response to the application of the rule being below the particular threshold, the learning module 110 may stop the analysis. In response to the application of the rule being greater than the particular threshold, the learning module 110 may analyze the date/time information pertaining to items from which the rule and/or the associated rules were generated. The date/time information may be referred to herein as a date/time distribution. Based at least partially on the date/time distribution, the learning module 110 may determine an extraction frequency.

For example, the particular threshold may be set to three. When the application of the rule and the associated rules is greater than three, the learning module 110 may determine that a sufficient number of learners 102 are adding items from the appropriate index page or sufficiently similar appropriate index pages to justify fetching learning materials therefrom. The learning module 110 may then analyze when the items are being added to the curations. The learning module 110 may determine the extraction frequency based on when the items are being added to curations. Additionally, the learning module 110 may stop the analysis when the rule is not used enough to justify the determination of the extraction frequency and subsequent fetching of learning materials based thereon.

Modifications, additions, or omissions may be made to the operating environment 50 and/or the learning system 100 without departing from the scope of the present disclosure. Specifically, embodiments of the operating environment 50 depicted in FIG. 1 include two learners 102, one third party server 114 hosting one website 126, and the learning system 100 that includes two devices 104 and one learning server 108. However, the present disclosure more generally applies to the operating environment 50 including one or more learners 102, one or more third party servers 114 hosting one or more websites 126, and the learning system 100 that may include one or more devices 104 and one or more learning servers 108, or any combination thereof.

Moreover, the separation of various components in the embodiments described herein is not meant to indicate that the separation occurs in all embodiments. In addition, it may be understood with the benefit of this disclosure that the described components may be integrated together in a single component or separated into multiple components.

The learning module 110 may include code and routines for identifying the appropriate index page and generating a rule. In some embodiments, the learning module 110 act in part as a thin-client application that may be stored on a computing device (e.g., the devices 104) and in part as components that may be stored on the learning server 108, for instance. In some embodiments, the learning module 110 may be implemented using hardware including a field-programmable gate array (FPGA) or an application-specific integrated circuit (ASIC). In some other instances, the learning module 110 may be implemented using a combination of hardware and software. Additionally, the learning module 110 and/or the personal repository 118 may be included on one or more of the devices 104.

In the operating environment 50, memory such as memory in the devices 104, the learning server 108, and the third party server 114 may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
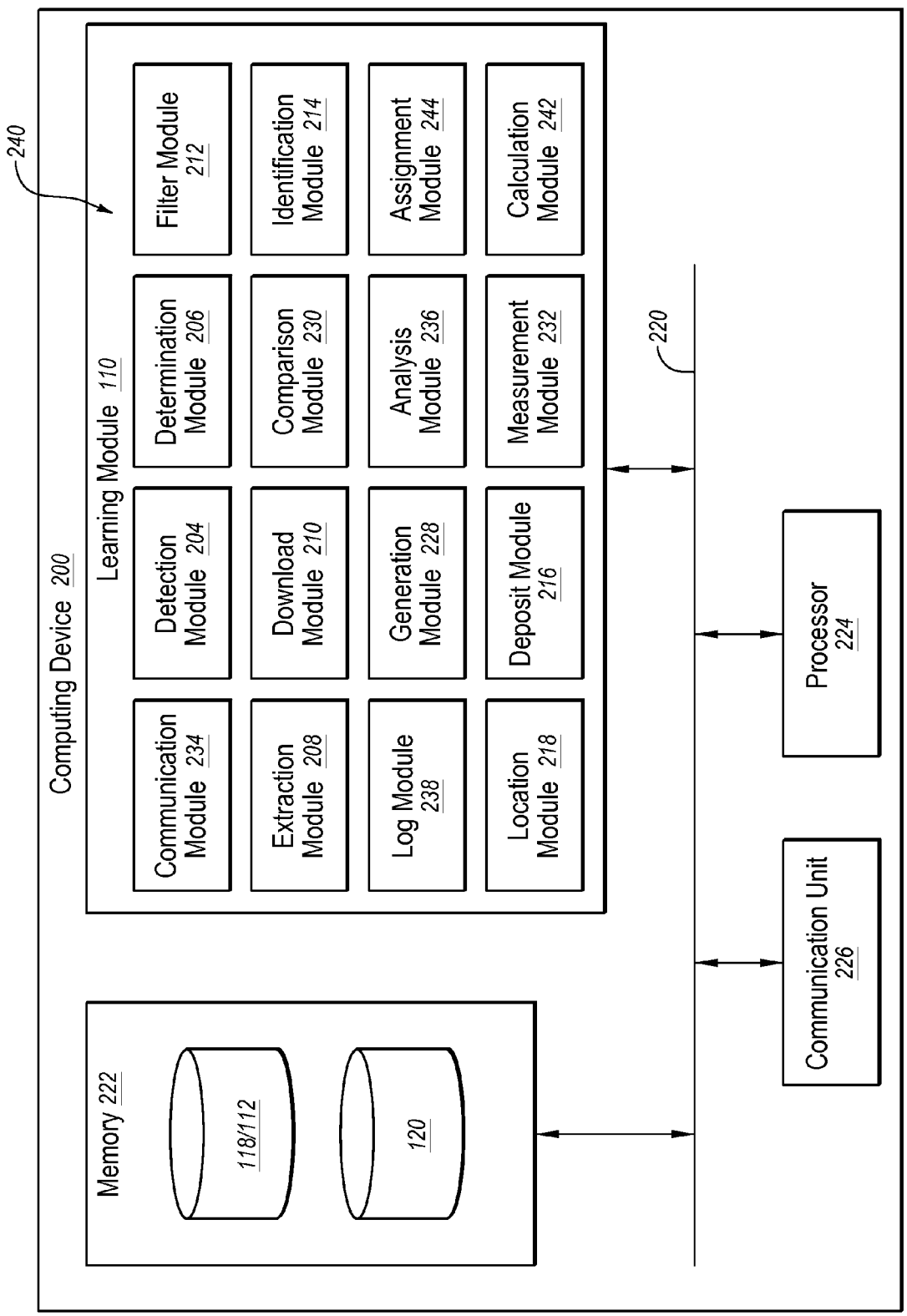
FIG. 2 is a block diagram of a computing device that includes an example learning module that may be implemented in the learning system of FIG. 1.

Referring now to FIG. 2, an example of the learning module 110 is shown in more detail. FIG. 2 is a block diagram of a computing device 200 that includes the learning module 110, a processor 224, a memory 222, and a communication unit 226. The components of the computing device 200 may be communicatively coupled by a bus 220. In some embodiments, the computing device 200 may include the learning server 108 or one of the devices 104 of the learning system 100 of FIG. 1.

With combined reference to FIGS. 1 and 2, the processor 224 may include an arithmetic logic unit (ALU), a microprocessor, a general-purpose controller, or some other processor array to perform computations and software program analysis. The processor 224 may be coupled to the bus 220 for communication with the other components (e.g., 110, 226, and 222). The processor 224 generally processes data signals and may include various computing architectures including a complex instruction set computer (CISC) architecture, a reduced instruction set computer (RISC) architecture, or an architecture implementing a combination of instruction sets. Although FIG. 2 includes a single processor 224, multiple processors may be included in the computing device 200. Other processors, operating systems, and physical configurations may be possible.

The memory 222 may be configured to store instructions and/or data that may be executed by the processor 224. The memory 222 may be coupled to the bus 220 for communication with the other components. The instructions and/or data may include code for performing the techniques or methods described herein. The memory 222 may be a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the depicted embodiment, the memory 222 includes the system repository 112, the personal repository 118, and the log 120. The system repository 112 and/or the personal repository 118 may be configured to receive learning materials. The log 120 may be configured to receive, store, and enable access to rules. Additionally, in some embodiments the system repository 112, the personal repository 118, or the log 120 may be configured to store and enable access to time/date information related to addition of items by the learners 102. For example, the learning module 110 may perform an analysis of rules and the time/date distributions to determine an extraction frequency. The learning module 110 may access the time/date information and/or may make comparisons between a first rule and earlier-generated rules accessed in the system repository 112, the personal repository 118, or the log 120.

The communication unit 226 may be configured to transmit and receive data to and from at least one of the third party server 114, the devices 104, and the learning server 108 depending upon where the learning module 110 is stored. The communication unit 226 may be coupled to the bus 220. In some embodiments, the communication unit 226 may include a port for direct physical connection to the network 140 or to another communication channel. For example, the communication unit 226 may include a USB, SD, CAT-5, or similar port for wired communication with the components of the learning system 100. In some embodiments, the communication unit 226 may include a wireless transceiver for exchanging data via communication channels using one or more wireless communication methods, including IEEE 802.11, IEEE 802.16, BLUETOOTH®, or another suitable wireless communication method.

In some embodiments, the communication unit 226 may include a cellular communications transceiver for sending and receiving data over a cellular communications network including via SMS, MMS, HTTP, direct data connection, WAP, e-mail, or another suitable type of electronic communication. In some embodiments, the communication unit 226 may include a wired port and a wireless transceiver. The communication unit 226 may also provide other conventional connections to the network 140 for distribution of files and/or media objects using standard network protocols including transmission control protocol/internet protocol (TCP/IP), HTTP, HTTP secure (HTTPS), and simple mail transfer protocol (SMTP), etc.

In the embodiment of FIG. 2, the learning module 110 may include a communication module 234, a detection module 204, a determination module 206, an extraction module 208, a download module 210, a filter module 212, an identification module 214, a deposit module 216, a location module 218, a generation module 228, a comparison module 230, a measurement module 232, an analysis module 236, an assignment module 244, a calculation module 242, and a log module 238 (collectively, the modules 240). Each of the modules 240 may be implemented as software including one or more routines configured to perform one or more operations. The modules 240 may include a set of instructions executable by the processor 224 to provide the functionality described below. In some instances, the modules 240 may be stored in or at least temporarily loaded into the memory 222 of the computing device 200 and may be accessible and executable by the processor 224. One or more of the modules 240 may be adapted for cooperation and communication with the processor 224 and components of the computing device 200 via the bus 220.

The communication module 234 may be configured to handle communications between the learning module 110 and other components of the computing device 200 (e.g., 224, 222, and 226). The communication module 234 may be configured to send and receive data, via the communication unit 226, to the third party server 114, the devices 104, and/or the learning server 108. In some instances, the communication module 234 may cooperate with the other modules (e.g., 204, 206, 208, 210, 212, 214, 216, 218, 228, 230, 232, 236, 238, 242, and 244) to receive and/or forward, via the communication unit 226, data from one or more of the third party server 114, the devices 104, and the learning server 108.

The detection module 204 may be configured to detect occurrences in the computing device 200 or in the devices and/or the learning server 108. For example, the detection module 204 may detect an addition of an item to a curation. The addition of the item may include the learner 102 bookmarking the item in the curation and/or adding the item to the curation. The detection module 204 may receive an indication of the addition of the item via the communication unit 226 and the communication module 234 in some embodiments. The detection module 204 may communicate a signal to the extraction module 208 indicating the item has been added.

Additionally, in some embodiments, the communication module 234 may communicate the time/date of the addition to the log module 238. The log module 238 may be configured to log the time/date of the addition to the log 120 or another location in the memory 222 via the bus 220. The time/date of the addition may be stored in the log 120, for instance, with or without a rule generated based on the addition as discussed herein.

The extraction module 208 may be configured to extract information from items and pages. For example, the extraction module 208 may receive the signal from the detection module 204 indicating the item has been added. The extraction module 208 may extract one or more links from a page referenced by the item. The links may correspond to the pages 116, which may exist in the website 126 hosted by the third party server 114, for instance. The pages 116 may be accessible via the network 140. The extraction module 208 may communicate a signal to the download module 210 including the links.

The download module 210 may be configured to receive links and download the pages 116 corresponding to the links. For example, the download module 210 may download the pages 116 corresponding to the one or more of the links in the page referenced by the item. The download module 210 may communicate the downloaded pages to the filter module 212.

The filter module 212 may be configured to filter downloaded pages based upon their content. For example, the filter module 212 may be configured to filter the downloaded pages to generate candidate index pages. In some embodiments, the filter module 212 may determine which of the downloaded pages includes links pointing back to the page referenced by the item. The filter module 212 may then exclude a subset of the downloaded pages not having links pointing back to the page referenced by the item. The filter module 212 may communicate the candidate index pages to the identification module 214.

The identification module 214 may be configured to identify an appropriate index page from the candidate index pages. In some embodiments, the identification module 214 may perform one or more of page structure analysis, a uniform resource locator (URL) structure analysis, and a content coherence analysis to identify the appropriate index page.

In some embodiments, the identification module 214 may coordinate with the location module 218, the detection module 204, the comparison module 230, the determination module 206, and the measurement module 232 to identify the appropriate index page.

For example, the detection module 204 may be configured to detect information blocks containing the links pointing back to the page referenced by the item in the candidate index pages. The detection module 204 may communicate a signal indicating the information blocks including the links to the location module 218. The location module 218 may be configured to locate a primary information block in one or more of the candidate index pages based on a page structure analysis.

For example, the location module 218 may analyze the location of the information blocks including the links pointing back to the page referenced by the item on the pages 116. When the information block is close to the center of the candidate index page, the information block may be the primary information block.

The comparison module 230 may be configured to compare structures of URLs of the candidate index pages. For example, in this and other embodiments, the comparison module 230 may compare URLs of the candidate index pages that include the links pointing back to the page referenced by the item in the primary information block. The comparison module 230 may communicate a signal indicating the comparison to the determination module 206.

The determination module 206 may be configured to determine whether URL structures of two or more of the candidate index pages have a same depth that is greater than the depths of the other candidate index pages. For example, a URL structure may include a protocol (e.g., http) followed by a domain name, followed by one or more subdirectories, followed by a file name. An example of URLs having the same depth may include two URLs that both include the protocol, the domain name, and a first subdirectory, but have different file names.

In response to the URL structures of two or more of the candidate index pages not having the same depth that is greater than the depths of the other candidate index pages, the identification module 214 may identify the appropriate index page based on URL depth. For instance, the candidate index page having the deepest URL may be identified as the appropriate index page.

In response to the URL structures of two or more of the candidate index pages having the same depth that is greater than the depths of the other candidate index pages, the determination module 206 may communicate the primary information blocks of the candidate index pages having URL structures with the same depth to the measurement module 232.

The measurement module 232 may be configured to measure content coherence. For example, in this and other embodiments, the measurement module 232 may measure content coherence of the primary information blocks of the candidate index pages having the same URL structure. The identification module 214 may identify the appropriate index page as the candidate index page having the highest content coherence.

Additionally or alternatively, the identification module 214 may coordinate with the location module 218, the detection module 204, the generation module 228, the assignment module 244, and the calculation module 242, to identify the appropriate index page.

For example, the detection module 204 may be configured to detect information blocks containing the links pointing back to the page referenced by the item in the candidate index pages. The detection module 204 may communicate a signal indicating the information blocks including the links to the location module 218. The location module 218 may be configured to locate a primary information block or determine there is not a primary information block in one or more of the candidate index pages based on a page structure analysis. The measurement module 232 may be configured to measure a page structure score, a URL score, and a coherence score for the one or more candidate index pages based on the page structure analysis, a URL structure analysis, and coherence analysis respectively.

The assignment module 244 may then assign a weight to each of the page structure score, the URL score, and the coherence score. The calculation module 242 may be configured to calculate a total score for one or more of the candidate index pages. The total scores may be calculated based on a linear combination of products each of the page structure score, the URL score, and the coherence score and the assigned weights for each of the candidate index pages. The identification module 214 may be configured to identify based on the total scores.

The identification module 214 and the location module 218 may communicate the appropriate index page and the primary information block to the generation module 228. The generation module 228 may be configured to generate rules. The rules may be configured to direct a system such as the devices 104, the learning server 108, or another similar system to the primary information block of the appropriate index page. The generation module 228 may communicate the rule to the communication module 234. The communication module 234 may communicate the rule to the log 120. Additionally, the communication module may use the rule to fetch a learning material from the primary information block of the appropriate index page. The communication module 234 may then communicate the learning material to the deposit module 216.

The deposit module 216 may be configured to receive learning materials and deposit the learning materials in the personal repository 118 and/or the system repository 112. For example, the deposit module 216 may receive the learning material and deposit the learning material in the personal repository 118.

After the rule is generated, the analysis module 236 may be configured to analyze the rule along with learning activities of multiple learners 102. Based on the analyzed learning activity, the determination module 206 may determine an extraction frequency. The communication module 234 may then fetch learning materials from the primary information block at the extraction frequency and the deposit module 216 may deposit the learning materials in the personal repository 118 and/or the system repository 112.

In some embodiments, the analysis module 236 may coordinate with the communication module 234, the log module 238, and the determination module 206 to determine the extraction frequency. For example, the communication module 234 may receive the rule as discussed above. The communication module 234 may communicate the rule to the log module 238. The log module 238 may log the rule. For example, the rule may be logged with the item, associated rules from multiple learners, date/time information, or some combination thereof.

The determination module 206 may then determine whether the rule exists in the log 120. In response to the rule not existing in the log 120, the analysis module 236 may stop the analysis of the rule. In response to the rule existing in the log 120, the determination module 206 may determine whether application of the rule and/or the associated extraction rules is greater than a particular threshold. In response to the application of the rule being below the particular threshold, the analysis module 236 may stop the analysis of the rule.

In response to the application of the rule being greater than the particular threshold, the analysis module 236 may analyze the date/time distribution of items from which the rule and/or the associated rules were generated. Based at least partially on the date/time distribution, the determination module 206 may determine the extraction frequency.

Figure 3:
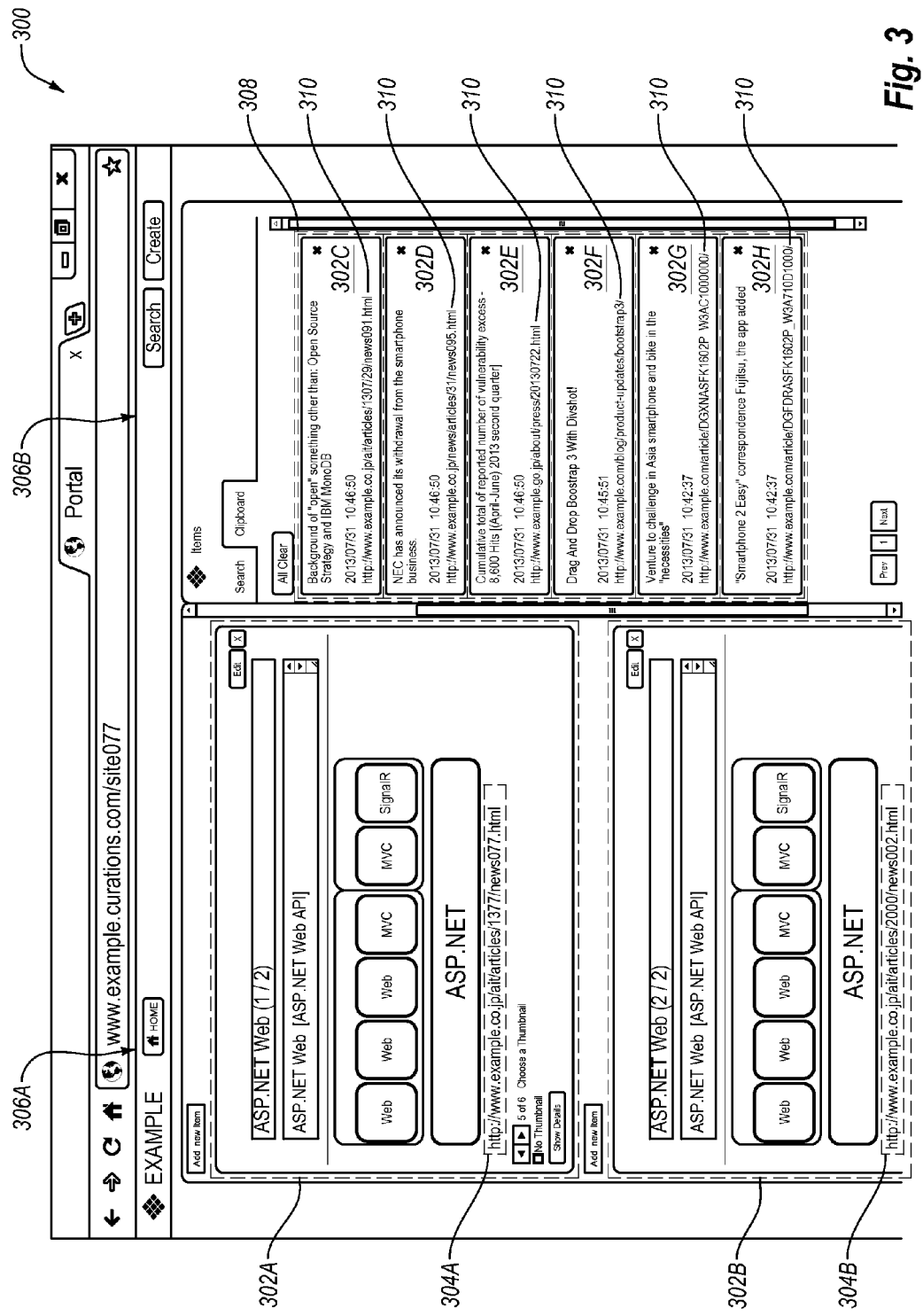
FIG. 3 illustrates an example screenshot of an example curation that may be created in the learning system of FIG. 1.

FIGS. 3-6 illustrate an example of identifying the appropriate index page and/or generating a rule from an item added to a curation. FIG. 3 illustrates an example screenshot of an example curation 300 that may be created in the learning system 100 of FIG. 1. The curation 300 may include two sides 306A and 306B. On a first side 306A, items 302A and 302B may be added. On a second side 306B, items 302C-302H may be bookmarked. The items 302A-302H are generally referred to as the item 302 or the items 302. The items 302 may include text, image, videos, articles, graphics, or any other digital information in any form. The items 302 may be copied from websites such as the website 126 of FIG. 1, may be created directly or indirectly by another learner, teacher, student, or administrator interfacing with a learning system, may be created by the learner creating the curation, or some combination thereof. The items 302 may be added to the curation 300 by copying or adding the item 302 as shown in on the first side 306A to the curation 300 or by bookmarking a link 310 to the item 302 in the curation 300 as shown in on the first side 306B.

For example, a first item 302A may have been added to the depicted curation 300. The first item 302A may include a portion of a page, an automatically generated or manually input summary of a page referenced by the item 302, which may include a title, description, an image, a URL, other information from the page, or some combination thereof. The first item 302A may include a first URL 304A of a page referenced by the first item 302A. The first URL 304A may include the web address of the page referenced by the first item 302A. Likewise, a second item 302B may have been added to the depicted curation 300 that includes some information from another page. The second item 302B may include a second URL 304B of a page referenced by the second item 302B. The second URL 304B may include the web address of the page referenced by the second item 302B. On the second side 306B, the curation 300 may include a list of bookmarks 308. The list of bookmarks 308 may include links 310 to items 302C-302H. The items 302C-302H may thereby be included in the curation 300 and may be accessed by selecting the links 310. Additionally or alternatively, the list of bookmarks 308 may include descriptions that may describe the items 302C-302H in addition to the links 310, for instance.

Figure 4:
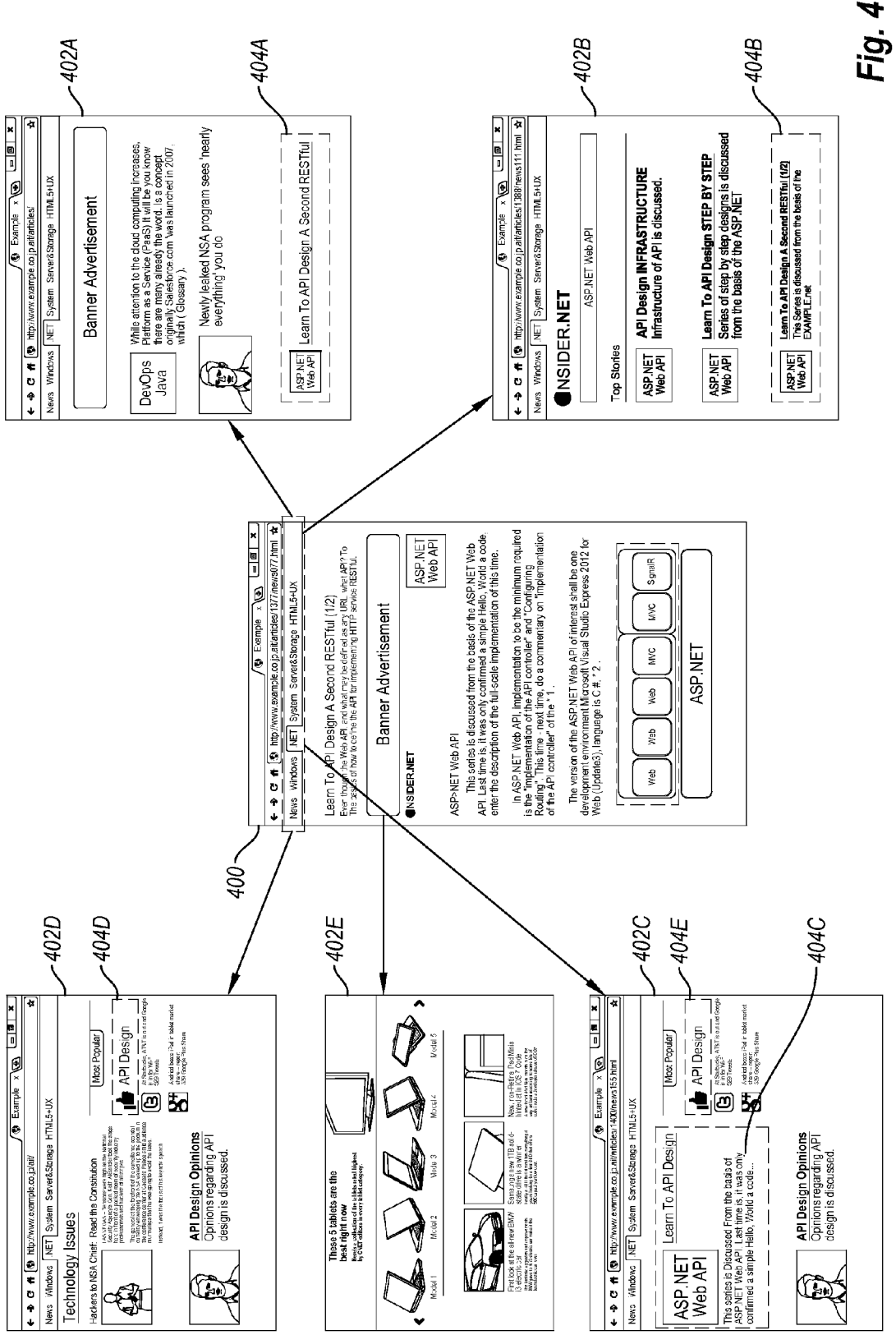
FIG. 4 illustrates a first item included in the curation of FIG. 3 with five downloaded pages.

FIG. 4 illustrates a page 400 referenced by the first item 302A of FIG. 3 with five downloaded pages 402A-402E (generally, page 402 or pages 402). One or more of the pages 402 may be substantially similar to and/or correspond to the pages 116 discussed with reference to FIG. 1. As stated above, the page 400 may include the links on a top menu. For example, links to a first page 402A, a second page 402B, a third page 402C, and a fourth page 402D may be included in the top menu. A link to a fifth page 402E may be included in a banner advertisement. More generally, the page 400 may include any number of links, including five, less than five, or more than five links.

The pages 402 may be downloaded. Additionally, the pages 402 may be analyzed to locate links 404A-404E pointing back to the page 400 (generally referred to as link 404 or links 404 pointing back to the page 400). For example, in the depicted embodiment, the first, second, third, and fourth pages 402A-402D may each include one of the links 404 pointing back to the page 400. In contrast, the fifth page 402E may not include a links 404 pointing back to the page 400. Accordingly, in this and other embodiments, candidate index pages may include the first, second, third, and fourth 402A-402D. The fifth page 402E may be excluded from the candidate index pages.

Figure 5:
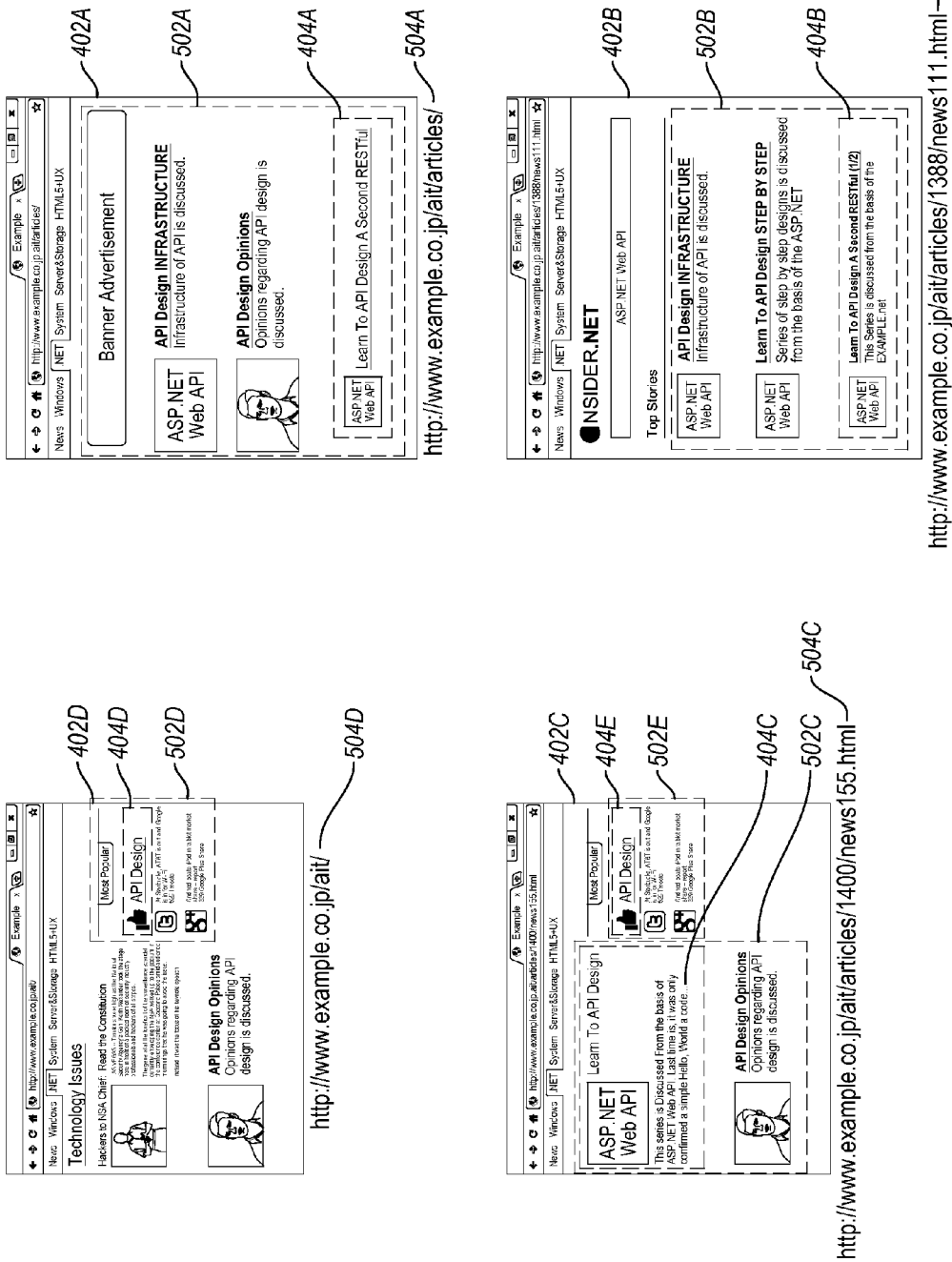
FIG. 5 illustrates some pages that may be candidate index pages filtered from the downloaded pages of FIG. 4.

FIG. 5 illustrates the pages 402A-402D that may be candidate index pages filtered from the pages 402A-402E of FIG. 4. The location of the links 404 pointing back to the page 400 of FIG. 4 may be determined. For example, in the first, second, and third pages 402A-402C, the links 404A-404C pointing back to the page 400 may be included in primary information blocks 502A-502C of the first, second, and third pages 402A-402C. The link 404D pointing back to the page 400 in the fourth page 402D may be located in a side informational block 502D. Additionally, the third page 402C may include a side link 404E in a side information block 502E. Accordingly, the first, second, and third pages 402A-402C may be determined to be better appropriate candidate pages than the fourth page 402D.

The first, second, and third 402A-402C may each include a URL 504A-504C. The structures of the URLs 504A-504C may be compared. A first URL 504A is shorter than a second URL 504B and a third URL 504C. Accordingly, the second URL 504B and the third URL 504C, and the may be considered better appropriate index pages than the first URL 504A insofar as the second URL 504B and the third URL 504C have more depth than the first URL 504A. In some embodiments, the URL 504D may also be compared to the URLs 504A-504C despite the link 404D pointing back to the page 400 in the fourth page 402D being located in a side informational block 502D.

Additionally, the second URL 504B and the third URL 504C may have the same length, which may indicate the same URL depth. In some embodiments, in response to second URL 504B and the third URL 504C may have a same depth, a content coherence analysis of the primary information blocks 502B and 502C may be performed. In this example, the second page 402B may be determined to be the appropriate index page after the content coherence analysis.

Additionally or alternatively, a page structure score, a URL score, and a coherence score may be generated for the one or more of the pages 402 based on the page structure analysis, a URL structure analysis, and a coherence analysis. Weights may be assigned to each of the page structure score, the URL score, and the coherence score. A total score may be calculated based on a linear combination of products each of the page structure score, the URL score, and the coherence score and the assigned weights for one or more of the pages 402A-402F. An appropriate index page may be identified based on the total scores.

Figure 6:
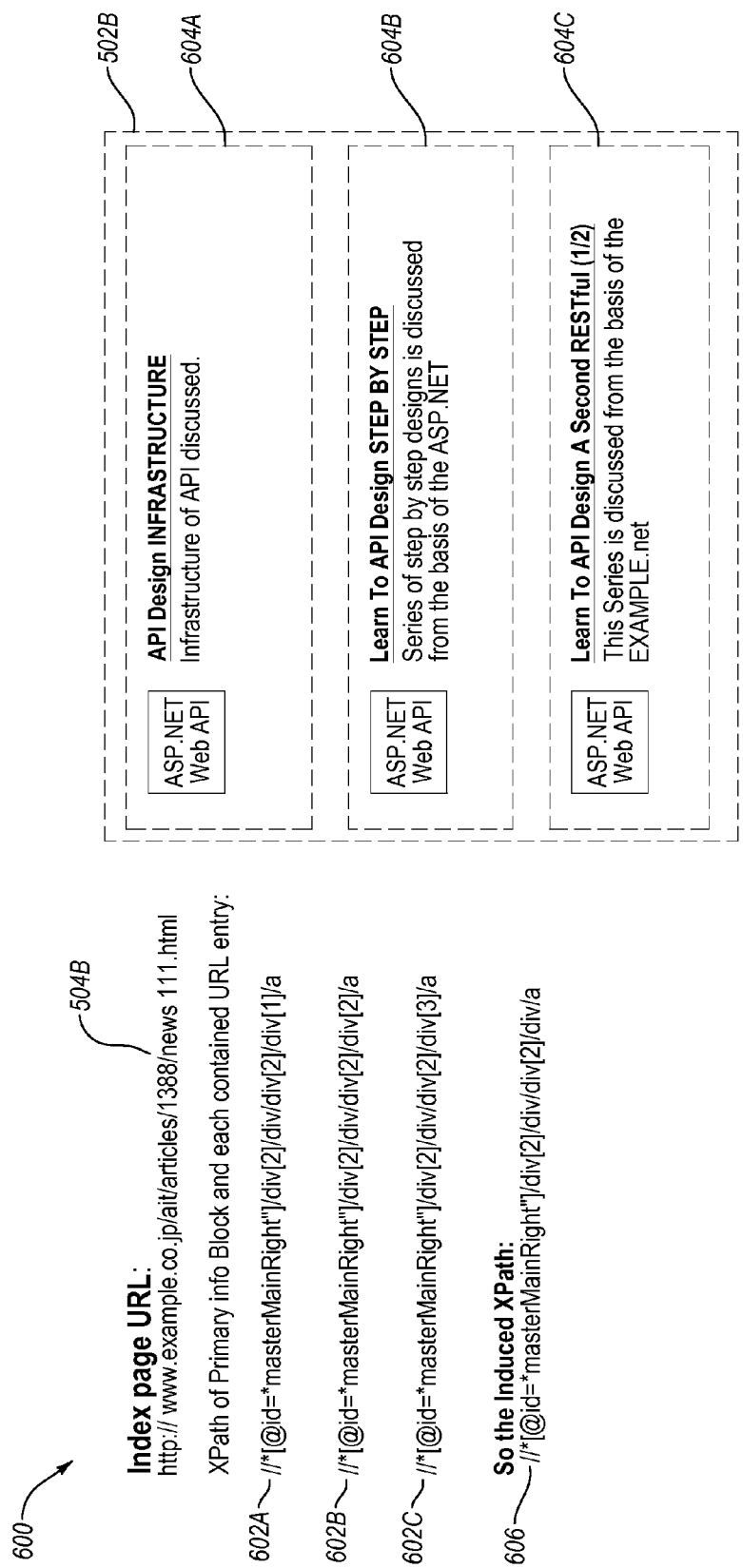
FIG. 6 illustrates an example rule that may be generated from an appropriate index page identified from the pages depicted in FIG. 5.

FIG. 6 depicts the primary information block 502B of the second page 402B. Additionally, FIG. 6 illustrates an example rule 600 that may be generated from an appropriate index page identified from the pages 402 depicted in FIG. 5. The primary information block 502B includes a list of links 604A-604C that may include URL entries. The coherence analysis may determine an average similarity among text associated with the links 604A-604C.

The rule 600 may include the second URL 504B of the second page 402B of FIGS. 4 and 5. The rule 600 may also include an induced XPath 606. The induced XPath may be induced from XPaths 602A-602C of the primary information block 502B and each contained URL entry of the second page 402B. Specifically, each of the XPaths 602A-602C corresponds to one of URL entries of each of the links 604A-604C of the primary information block 502B of the second page 402B.

Figure 7A:
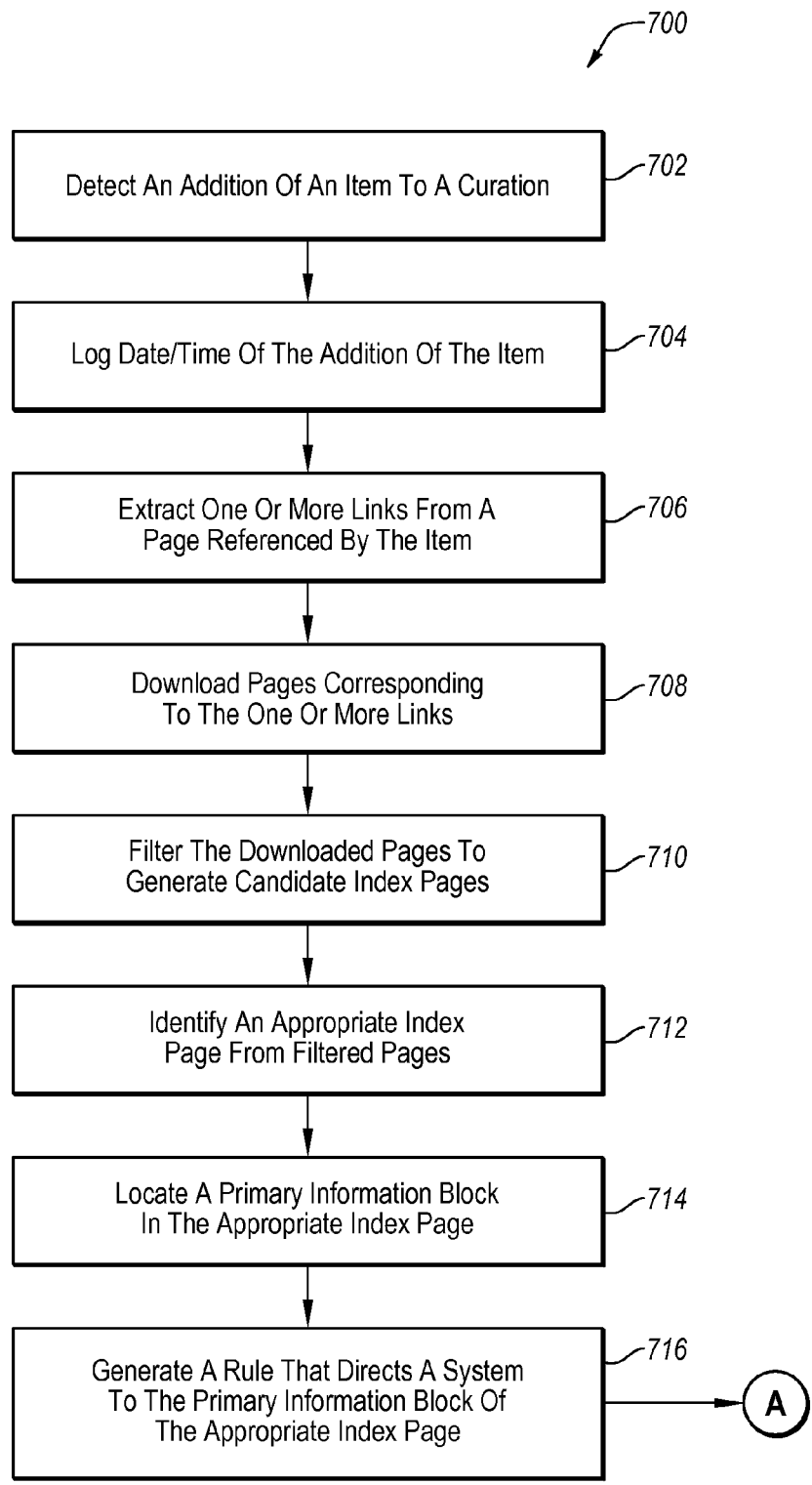
FIGS. 7A and 7B are flow diagrams of an example method of collecting learning materials for informal learning.
Figure 7B:
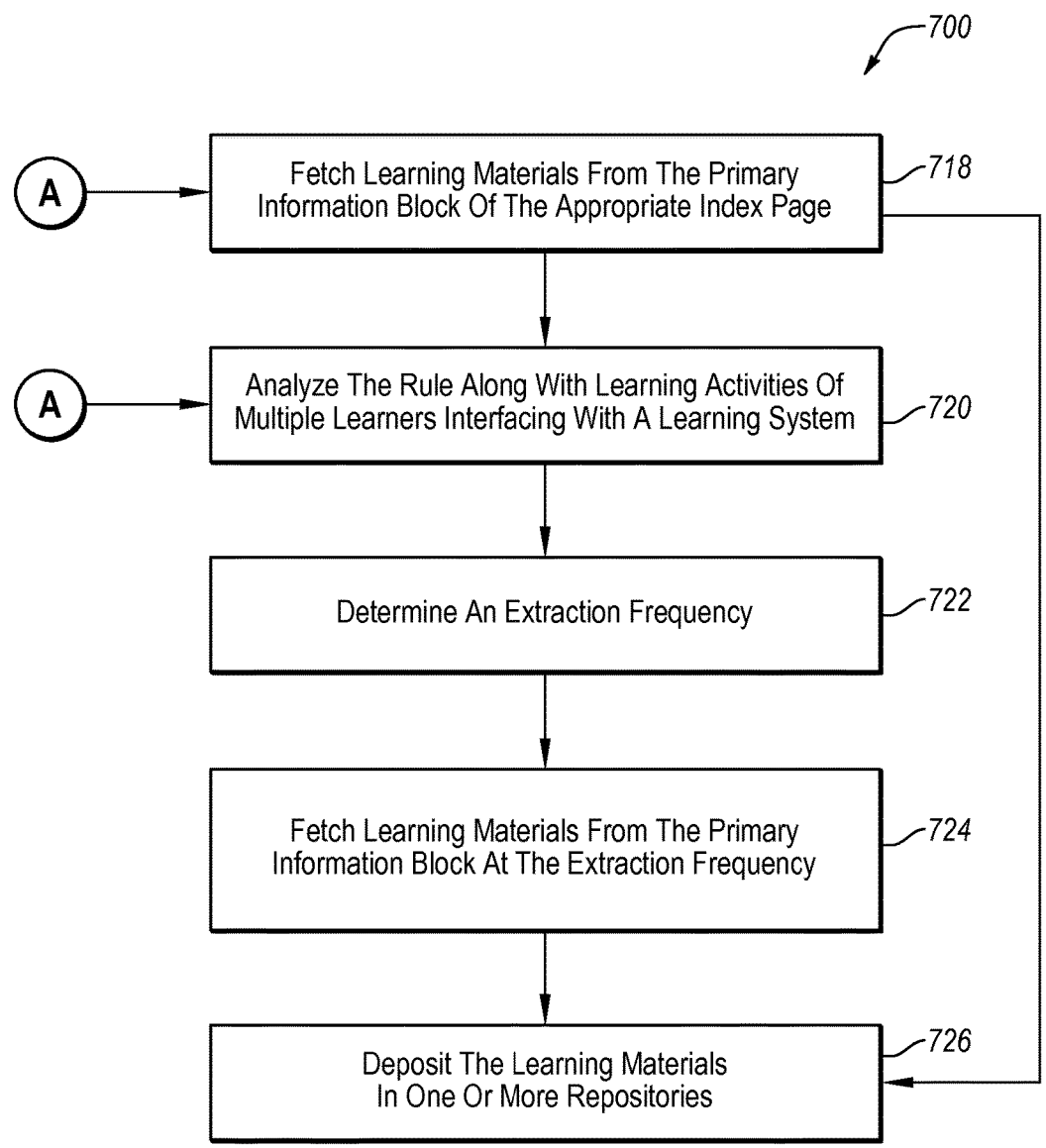

FIGS. 7A and 7B are flow diagrams of an example method 700 of collecting learning materials for informal learning, arranged in accordance with at least one embodiment described herein. The method 700 may be programmably performed in some embodiments by the computing device 200 described with reference to FIG. 2. Additionally or alternatively, the method 700 may be programmably performed by the devices 104 or the learning server 108 of FIG. 1. The devices 104, the learning server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 700. The devices 104, the learning server 108, and the computing device 200 may include a processor (e.g., the processor 224 of FIG. 2) that is configured to execute computer instructions to cause or control performance of the method 700. Although illustrated as discrete blocks, various blocks may be divided into additional blocks, combined into fewer blocks, or eliminated, depending on the desired implementation.

With reference to FIG. 7A, the method 700 may begin at block 702, where an addition of an item to a curation may be detected. The addition of the item may include the item being bookmarked in the curation or the item being added to curation. At block 704, the date/time of the addition of the item may be logged. For example, with reference to FIG. 1, when the first learner 102A adds the page 116 to the curation, the learning module 110 may log that the page 116 is added to the curation at a corresponding date/time in the log 120.

At block 706, one or more links may be extracted from a page referenced by the item. At block 708, pages corresponding to the one or more links may be downloaded. For example, with reference to FIG. 1, the page 116 added by the first learner 102A may include multiple links to other pages 116. The learning module 110 may access the page 116 added to the curation and may extract therefrom the links to the other pages 116. The other pages 116 that correspond to the links may be downloaded from the website 126.

At block 710, the downloaded pages may be filtered to generate candidate index pages. In some embodiments, the filtering includes excluding a subset of the downloaded pages that do not have links that point back to the page referenced by the item.

At block 712, an appropriate index page may be identified from the filtered pages. In some embodiments, the appropriate index page may be identified using page structure analysis, a URL structure analysis, a content coherence analysis, or some combination thereof. Additionally or alternatively, the appropriate index page may be identified as described with reference to FIG. 8 and/or FIG. 10.

At block 714, a primary information block on the appropriate index page may be located. At block 716, a rule may be generated. The rule may be configured to direct a system to the primary information block of the appropriate index page. In some embodiments, the rule may include the URL of the appropriate index page and an induced XPath of one or more URLs contained in the primary information block.

Referring to FIG. 7B, after block 716, the method 700 may proceed to block 718 and/or block 720. At block 718, learning materials may be fetched from the primary information block of the appropriate index page. In some embodiments, the learning materials may be fetched using the rule. Fetching learning materials using the rule may include fetching all the pages pointed to by links that match the induced XPath. The method 700 may proceed from block 718 to block 720 and/or block 726.

At block 720 the rule along with learning activities of multiple learners interfacing with a learning system may be analyzed. For example, with reference to FIG. 1, the learners 102 may include learners interfacing with a learning system. At block 722, an extraction frequency may be determined. The extraction frequency may be based on the analyzed learning activity.

At block 724 learning materials may be fetched from the primary information block at the extraction frequency. At block 726, the learning materials may be deposited in one or more repositories.

Figure 8:
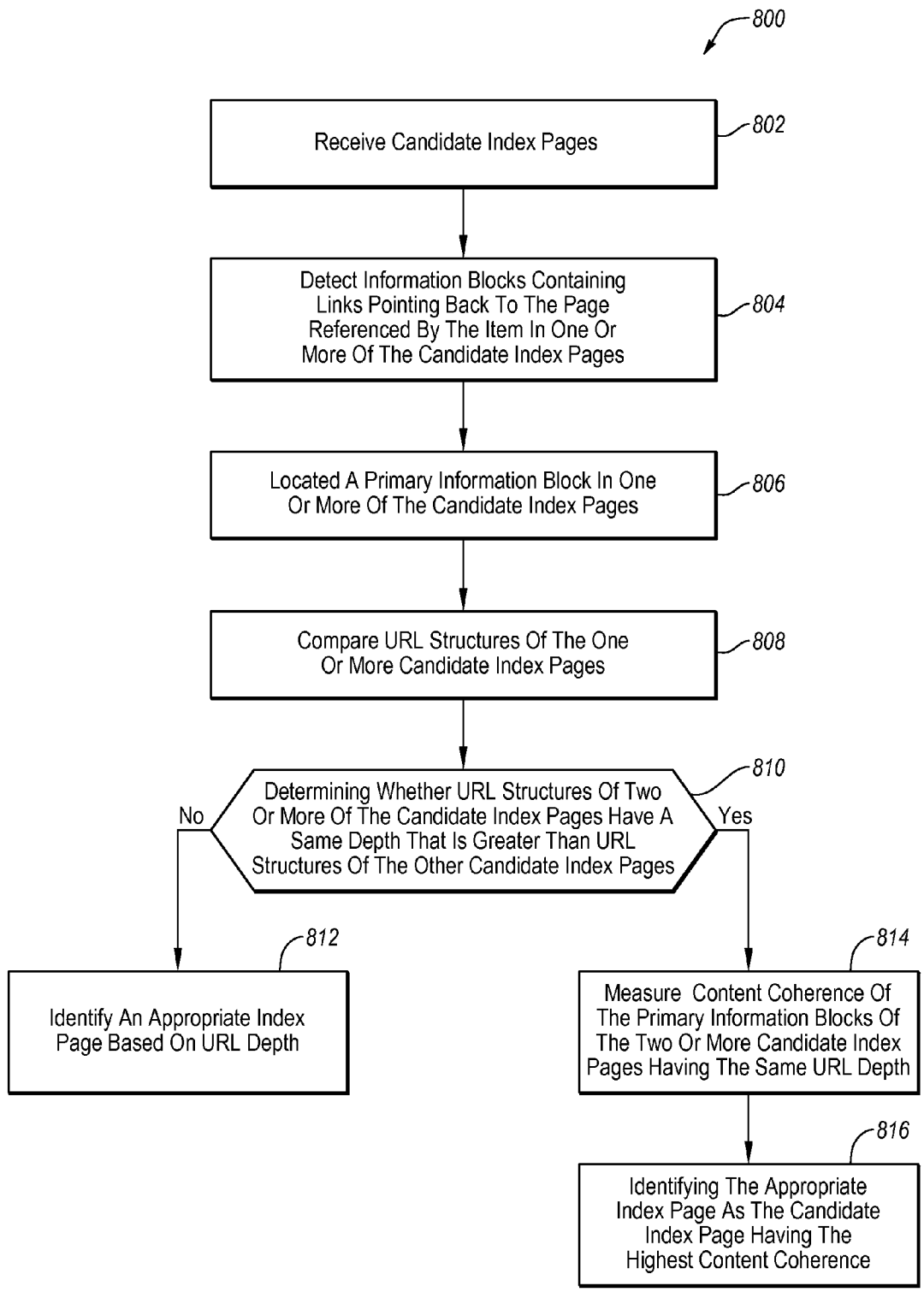
FIG. 8 is a flow diagram of an example method of identifying an appropriate index page from candidate index pages.

FIG. 8 is a flow diagram of an example method 800 of identifying an appropriate index page from candidate index pages, arranged in accordance with at least one embodiment described herein. The method 800 may be programmably performed in some embodiments by the computing device 200 described with reference to FIG. 2. Additionally or alternatively, the method 800 may be programmably performed by the devices 104 or the learning server 108 of FIG. 1. The devices 104, the learning server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 800. The devices 104, the learning server 108, and the computing device 200 may include a processor (e.g., the processor 224 of FIG. 2) that is configured to execute computer instructions to cause or control performance of the method 800. Although illustrated as discrete blocks, various blocks may be divided into additional blocks, combined into fewer blocks, or eliminated, depending on the desired implementation.

At block 802, candidate index pages may be received. The candidate index pages may include pages downloaded from links extracted from a page referenced by an item added to a curation. At block 804, information blocks containing links pointing back to the page referenced by the item may be detected in one or more of the candidate index pages. At block 806, a primary information block may be located in one or more of the candidate index pages. In some embodiments, locating the primary information blocks may be based on page structure analysis.

At block 808, URL structures of one or more of the candidate index pages may be compared. In some embodiments, the URL structures of the candidate index pages that include the link pointing back to the page referenced by the item in the primary information block may be compared.

At block 810, it may be determined whether URL structures of two or more of the candidate index pages have a same depth that is greater than URL structures of the other candidate index pages. In response to the URL structures of two or more of the candidate index pages not having the same depth that is greater than URL structures of the other candidate index pages ("No" at 810), the method 800 may proceed to block 812. In response to the URL structures of two or more of the candidate index pages having the same depth that is greater than URL structures of the other candidate index pages ("Yes" at 810), the method 800 may proceed to blocks 814 and 816.

At block 812, an appropriate index page may be identified based on URL depth. At block 814, the content coherence of the primary information blocks of the two or more candidate index pages having the same URL depth may be measured. At block 816, an appropriate index page may be identified as the candidate index page having the highest content coherence.

Figure 9:
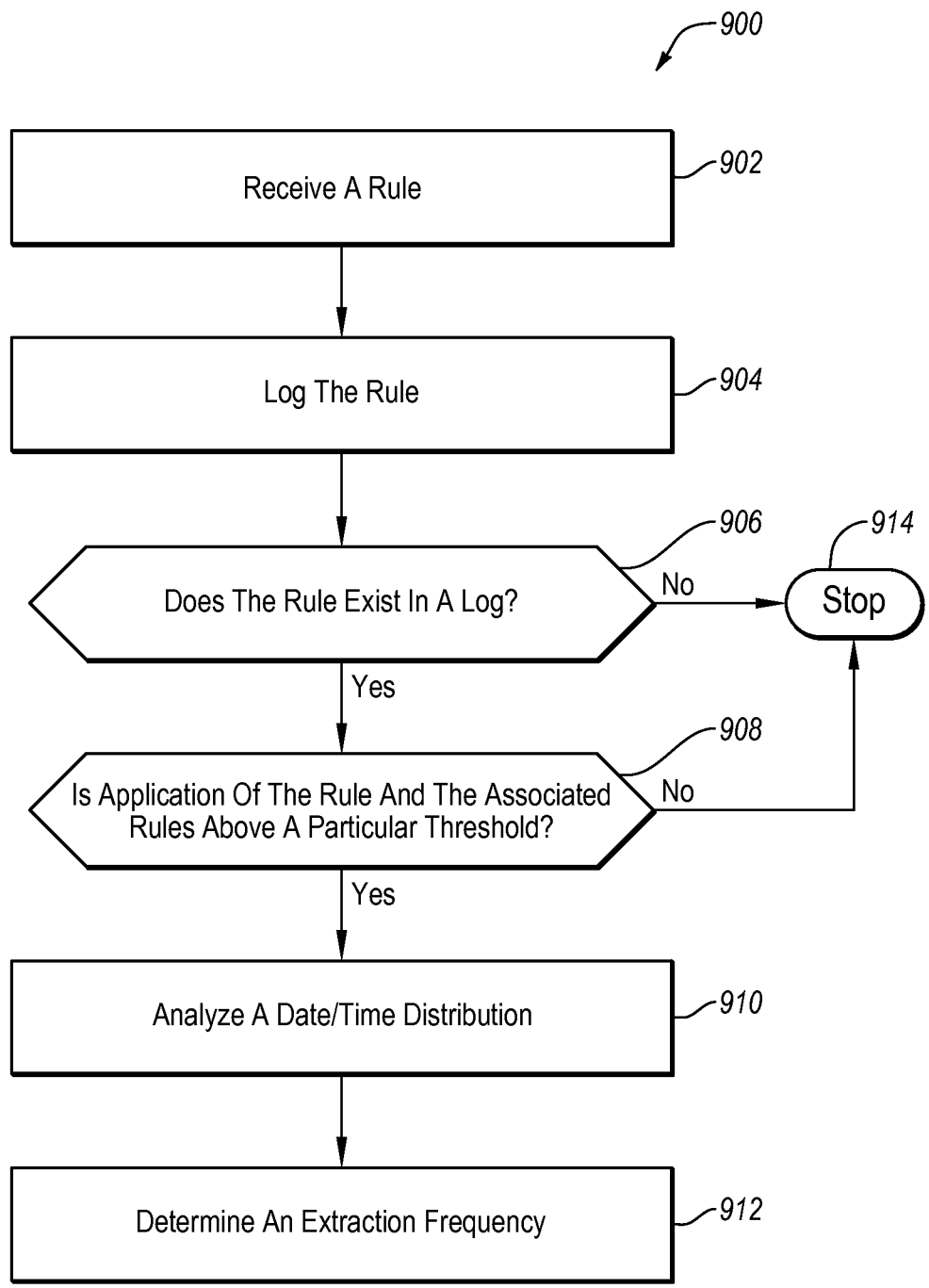
FIG. 9 is a flow diagram of an example method of analyzing a rule along with learning activities of multiple learners.

FIG. 9 is a flow diagram of an example method 900 of analyzing a rule along with learning activities of multiple learners, arranged in accordance with at least one embodiment described herein. The method 900 may be programmably performed in some embodiments by the computing device 200 described with reference to FIG. 2. Additionally or alternatively, the method 900 may be programmably performed by the devices 104 or the learning server 108 of FIG. 1. The devices 104, the learning server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 900. The devices 104, the learning server 108, and the computing device 200 may include a processor (e.g., the processor 224 of FIG. 2) that is configured to execute computer instructions to cause or control performance of the method 900. Although illustrated as discrete blocks, various blocks may be divided into additional blocks, combined into fewer blocks, or eliminated, depending on the desired implementation.

The method 900 may begin at block 902 where a rule may be received. At block 904, the rule may be logged. In some embodiments, the rule may be logged with the item from which the rule was generated. Additionally or alternatively, the rule may be logged with associated rules from one or more other learners. Additionally or alternatively, the rule may be logged items that were fetched using the rule and/or using the associated rules.

At block 906, it may be determined whether the rule exists in a log. In response to the rule not existing in the log ("No" at 906), the method 900 may proceed to block 914 where the method 900 may stop. In response to the rule existing in the log ("Yes" at 906), the method 900 may proceed to block 908.

At block 908, it may be determined whether application of the rule and the associated rule is above a particular threshold 908. In response to the application being below the particular threshold ("No" at 908), the method 900 may proceed to block 914 where the method 900 may stop. In response to the application being above the particular threshold ("Yes" at 908), the method 900 may proceed to block 910.

At block 910, a date/time distribution may be analyzed. The date/time distribution may include items added from which the rule was generated, the items from which associated rules were generated, the items that were fetched using the rule and/or the associated rule, or any combination thereof. At block 912, an extraction frequency may be determined. The extraction frequency may be determined based on the date/time distribution.

Figure 10:
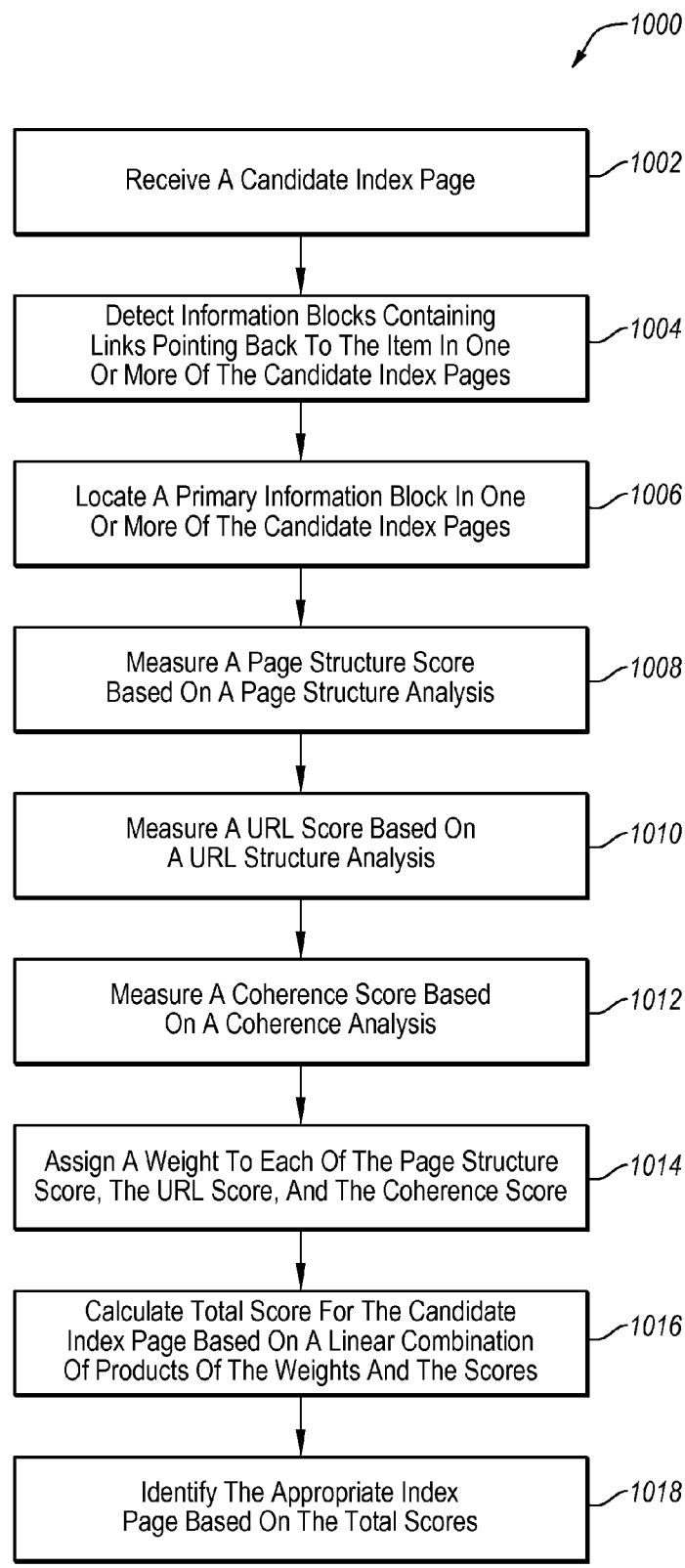
FIG. 10 is a flow diagram of another example method of identifying an appropriate index page from candidate index pages, all arranged in accordance with at least one embodiment described herein.

FIG. 10 is a flow diagram of an example method 1000 of identifying an appropriate index page from candidate index pages, arranged in accordance with at least one embodiment described herein. The method 1000 may be programmably performed in some embodiments by the computing device 200 described with reference to FIG. 2. Additionally or alternatively, the method 1000 may be programmably performed by the devices 104 or the learning server 108 of FIG. 1. The devices 104, the learning server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 1000. The devices 104, the learning server 108, and the computing device 200 may include a processor (e.g., the processor 224 of FIG. 2) that is configured to execute computer instructions to cause or control performance of the method 1000. Although illustrated as discrete blocks, various blocks may be divided into additional blocks, combined into fewer blocks, or eliminated, depending on the desired implementation.

At block 1002, candidate index pages may be received. The candidate index pages may include pages downloaded from links extracted from a page referenced by an item added to a curation. At block 1004, information blocks containing links pointing back to the page referenced by the item may be detected in one or more of the candidate index pages. At block 1006, a primary information block may be located in one or more of the candidate index pages. In some embodiments, the primary information block may be located based on a page structure analysis. At block 1008, a page structure score may be measured for the one or more candidate index pages. At block 1010, a URL score may be measured for one or more of the candidate index pages. The URL score may be based on a URL structure analysis. For instance, a candidate index page having a longer URL may have a higher score than another candidate index page having a shorter URL. At block 1012, a coherence score may be measured for the one or more candidate index pages. The coherence score may be based on a coherence analysis. For example, a candidate index page having a high coherence of content included in a primary information block or a side information block may have a higher score than another candidate index page having a low coherence of the content included a primary information block or a side information block.

At block 1014, weight may be assigned to each of the page structure score, the URL score, and the coherence score. At block 1016, for each of the candidate index pages, a total score may be calculated based on a linear combination of products each of the page structure score, the URL score, and the coherence score and the assigned weights. At block 1018, the appropriate index page may be identified based on the total scores. For example, a candidate index page having a highest total score may be identified as the appropriate index page.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

The invention claimed is:

1. A method of collecting learning materials for informal learning, the method comprising:
   detecting an addition of an item to a curation;
   extracting one or more links from a page referenced by the item;
   downloading pages corresponding to the one or more links;
   filtering the downloaded pages to generate candidate index pages by excluding a subset of the downloaded pages not having links that point back to the page referenced by the item;
   detecting information blocks containing links pointing back to the page referenced by the item in one or more of the candidate index pages;
   locating a primary information block in one or more of the candidate index pages based on a page structure analysis;
   performing a uniform resource locator (URL) structures analysis of the one or more of the candidate index pages that include the links pointing back to the page referenced by the item in the primary information block;
   based at least partially on the URL structures analysis, identifying an appropriate index page from the candidate index pages;
   locating a primary information block in the appropriate index page, the primary information block including a portion of the appropriate index page where a majority of substantive information is contained; and
   generating an automated extraction rule configured to direct a system to the primary information block of the appropriate index page.

2. The method of claim 1, wherein the identifying includes performing one or more of page structure analysis and a content coherence analysis.

3. The method of claim 1, wherein:
   the URL structures analysis includes comparing the URL structures of the one or more of the candidate index pages; and
   the identifying includes:
      determining whether URL structures of two or more of the candidate index pages have a same depth that is greater than URL structures of the other candidate index pages;
      in response to the URL structures of two or more of the candidate index pages not having the same depth that is greater than URL structures of the other candidate index pages, identifying the appropriate index page based on URL depth; and
      in response to the URL structures of two or more of the candidate index pages having the same depth that is greater than the URL structures of the other candidate index pages:
         measuring content coherence of the primary information blocks of the two or more candidate index pages having the same URL depth; and
         identifying the appropriate index page as the candidate index page having the highest content coherence.

4. The method of claim 1, further comprising:
   analyzing the automated extraction rule along with learning activities of multiple learners interfacing with a learning system;
   based on the analyzed learning activity, determining an extraction frequency;
   fetching learning materials from the primary information block at the extraction frequency; and
   depositing the learning materials in one or more repositories of learning materials.

5. The method of claim 4, wherein the analyzing includes:
   receiving the automated extraction rule;
   logging the automated extraction rule with the item from which the automated extraction rule was generated and with associated extraction rules from one or more other learners;

determining whether the automated extraction rule exists in a log;

in response to the automated extraction rule not existing in the log, stopping analysis of the automated extraction rule;

in response to the automated extraction rule existing in the log, determining whether application of the automated extraction rule and the associated extraction rules is greater than a particular threshold;

in response to the application of the automated extraction rule being below the particular threshold, stopping the analysis;

in response to the application of the automated extraction rule being greater than the particular threshold, analyzing a date/time distribution of items added from which the automated extraction rule was generated and the associated extraction rules; and based at least partially on the date/time distribution, determining an extraction frequency.

6. The method of claim 1, wherein the automated extraction rule includes:

a URL of the appropriate index page; and an induced XPath of one or more URLs contained in the primary information block.

7. The method of claim 1, further comprising logging the time/date of the addition of the item.

8. The method of claim 1, wherein:

the URL structures analysis includes measuring a URL score for the one or more candidate index pages based on the URL structure analysis; and the identifying includes:

measuring a page structure score for the one or more candidate index pages based on the page structure analysis;

measuring a coherence score for the one or more candidate index pages based on a coherence analysis;

assigning a weight to each of the page structure score, the URL score, and the coherence score;

for each of the one or more candidate index pages, calculating a total score based on a linear combination of products each of the page structure score, the URL score, and the coherence score and the assigned weights; and identifying the appropriate index page based on the total scores.

9. The method of claim 1, further comprising:

fetching a learning material from the primary information block in the appropriate index page using the automated extraction rule; and depositing the learning material in a repository of learning materials.

10. A non-transitory computer-readable medium having encoded therein programming code executable by a processor to perform operations comprising:

detecting an addition of an item to a curation;

extracting one or more links from a page referenced by the item;

downloading pages corresponding to the one or more links;

filtering the downloaded pages to generate candidate index pages by excluding a subset of the downloaded pages not having links that point back to the page referenced by the item;

detecting information blocks containing links pointing back to the page referenced by the item in one or more of the candidate index pages;

locating a primary information block in one or more of the candidate index pages based on a page structure analysis;

performing a uniform resource locator (URL) structures analysis of the one or more of the candidate index pages that include the links pointing back to the page referenced by the item in the primary information block;

based at least partially on the URL structures analysis, identifying an appropriate index page from the candidate index pages;

locating a primary information block in the appropriate index page, the primary information block including a portion of the appropriate index page where a majority of substantive information is contained; and generating an automated extraction rule configured to direct a system to the primary information block of the appropriate index page.

11. The non-transitory computer-readable medium of claim 10, wherein the identifying includes performing one or more of page structure analysis and a content coherence analysis.

12. The non-transitory computer-readable medium of claim 10, wherein:

the URL structures analysis includes comparing the URL structures of the one or more of the candidate index pages; and the identifying includes:

determining whether URL structures of two or more of the candidate index pages have a same depth that is greater than URL structures of the other candidate index pages;

in response to the URL structures of two or more of the candidate index pages not having the same depth that is greater than URL structures of the other candidate index pages, identifying the appropriate index page based on URL depth; and in response to the URL structures of two or more of the candidate index pages having the same depth that is greater than the URL structures of the other candidate index pages:

measuring content coherence of the primary information blocks of the two or more candidate index pages having the same URL depth; and identifying the appropriate index page as the candidate index page having the highest content coherence.

13. The non-transitory computer-readable medium of claim 10, wherein the operations further comprise:

analyzing the automated extraction rule along with learning activities of multiple learners interfacing with a learning system;

based on the analyzed learning activity, determining an extraction frequency;

fetching learning materials from the primary information block at the extraction frequency; and depositing the learning materials in one or more repositories of learning materials.

14. The non-transitory computer-readable medium of claim 13, wherein the analyzing includes:

receiving the automated extraction rule;

logging the automated extraction rule with the item from which the automated extraction rule was generated and with associated extraction rules from one or more other learners;

determining whether the automated extraction rule exists in a log;

in response to the automated extraction rule not existing in the log, stopping analysis of the automated extraction rule;

in response to the automated extraction rule existing in the log, determining whether application of the automated extraction rule and the associated extraction rules is greater than a particular threshold;

in response to the application of the automated extraction rule being below the particular threshold, stopping the analysis;

in response to the application of the automated extraction rule being greater than the particular threshold, analyzing a date/time distribution of items added from which the automated extraction rule was generated and the associated extraction rules; and based at least partially on the date/time distribution, determining an extraction frequency.

15. The non-transitory computer-readable medium of claim 10, wherein the automated extraction rule includes:
   a URL of the appropriate index page; and
   an induced XPath of one or more URLs contained in the primary information block.

16. The non-transitory computer-readable medium of claim 10, wherein the operations further comprise logging the time/date of the addition of the item.

17. The non-transitory computer-readable medium of claim 10, wherein:
   the URL structures analysis includes measuring a URL score for the one or more candidate index pages based on the URL structure analysis; and
   the identifying includes:
      measuring a page structure score for the one or more candidate index pages based on the page structure analysis;
      measuring a coherence score for the one or more candidate index pages based on a coherence analysis;
      assigning a weight to each of the page structure score, the URL score, and the coherence score;
      for each of the one or more candidate index pages, calculating a total score based on a linear combination of products each of the page structure score, the URL score, and the coherence score and the assigned weights; and
      identifying the appropriate index page based on the total scores.

18. The non-transitory computer-readable medium of claim 10, wherein the operations further comprise:
   fetching a learning material from the primary information block in the appropriate index page using the automated extraction rule; and
   depositing the learning material in a repository of learning materials.

* * * * *